United States Patent [19]
Koelsch

[11] 3,889,032
[45] June 10, 1975

[54] FOAMED PLASTIC SHEET MATERIAL AND SYSTEM FOR ITS MANUFACTURE

[76] Inventor: Lester Max Koelsch, 219 Conestoga St., Windsor, Conn. 06095

[22] Filed: May 10, 1972

[21] Appl. No.: 251,944

[52] U.S. Cl........428/218; 264/48; 264/51; 264/126; 428/220
[51] Int. Cl............................................. B32b 3/12
[58] Field of Search.......... 161/159, 161, 166, 168, 161/124; 264/48, 51, 53, DIG. 14, DIG. 4, 125–127; 260/2.5 R, 2.5 B

[56] References Cited
UNITED STATES PATENTS

| | | | |
|---|---|---|---|
| 2,958,905 | 11/1960 | Newberg et al. | 264/51 |
| 3,007,203 | 11/1961 | Ammons | 264/DIG. 14 |
| 3,082,483 | 3/1963 | Bickford | 260/2.5 B |
| 3,504,068 | 3/1970 | Zizlsperger | 260/2.5 B |
| 3,651,180 | 3/1972 | Glueckert | 264/51 |

FOREIGN PATENTS OR APPLICATIONS

| | | | |
|---|---|---|---|
| 1,061,702 | 3/1967 | United Kingdom | 161/168 |
| 1,500,623 | 11/1966 | France | 264/51 |

OTHER PUBLICATIONS
Modern Plastics, Vol. 38, No. 71, July 1961, pp. 92–93, 162.

*Primary Examiner*—George F. Lesmes
*Assistant Examiner*—Stanley S. Silverman
*Attorney, Agent, or Firm*—Prutzman, Hayes, Kalb & Chilton

[57] ABSTRACT

Foamed polymeric sheet material having a thickness of about .06 to .25 inch and a medium to high density of 5–15 pounds per cubic foot is produced by a compression molding technique to impart a fused latticework interior configuration with an elongated, closed-cell, pore structure extending along the plane of the sheet thereby imparting reduced brittleness and improved flexibility and rendering the foamed plastic material suitable for use as a replacement for fibrous board material. The compression molding system requires means for heating preexpanded polystyrene to its fusion temperature within a confined mold, compression of the heated plastic at a compression ratio of about 2:1 to 6:1 and subsequent cooling of the material while under compression.

4 Claims, 3 Drawing Figures

FOAMED PLASTIC SHEET MATERIAL AND SYSTEM FOR ITS MANUFACTURE

BACKGROUND AND SUMMARY OF THE INVENTION

The present invention relates generally to the production of thin foamed plastic sheets. More particularly it is concerned with a new and improved foamed plastic sheet or board material and a new and improved method and system for its manufacture.

In recent years the production of foamed plastic materials has become well-known and such material has been extensively employed for numerous uses. Generally, these materials, such as expanded polystyrene, exhibit light weight, low cost and excellent thermal and accoustical insulating qualities. Consequently, they have found wide acceptance, particularly in the packaging field. Conventionally these foamed or expanded cellular synthetic materials are of low density, i.e., about 1–3 pounds per cubic foot, and exhibit little or no resiliency or flexibility and undesirable brittleness. These qualities have limited its use to those applications where a rigid construction is utilized. Although extremely thin sections of less then one-half inch thickness and very low density will exhibit somewhat greater flexibility due to the very thin cross-sectional dimension thereof, the strength characteristics of such materials are extremely low and the brittleness of the material, when coupled with the low strength and reduced thickness, renders such thin sections unsuited for many applications where even limited bending is encountered, such as replacements for fiber board material. Such thin, low density material also exhibits practically no corner strength and is therefore unsuited as a replacement for fiber board material in such uses as backings for book covers, loose leaf binders, portfolio stiffeners and similar applications. Unfortunately even a slight increase in density tends to substantially reduce the flexibility of the thin board material and rapidly increase the brittleness thereof.

Accordingly, it is an object of the present invention to provide a new and improved foamed polymer sheet or board material of controlled density and thickness and of sufficient strength, resiliency and flexibility to be used as a replacement for fiber board material in backings for book covers and similar applications.

Another object of the present invention is to provide a new and improved system for producing thin foamed plastic sheet material of the type described to impart thereto a unique internal configuration at an increased density level thereby eliminating the disadvantageous brittleness and low strength characteristics heretofore evidenced in such material while at the same time retaining the flexibility formerly associated only with low density material. Included in this object is the provision for a method and apparatus for controlled compression molding of foamed polymeric sheet material to provide a smooth surface or skin of high strength characteristics coupled with fusion of discrete polymer particles into a multiplicity of interlaced flexure points of honeycomb configuration thereby imparting flexibility approaching that of fibrous board material.

An additional object of the present invention is to provide a system for producing the foamed plastic sheet material of the type described in a low cost, rapid and efficient manner while at the same time maintaining precise, accurate and controlled dimensions in the finished product.

Other objects will be in part obvious and in part pointed out in more detail hereinafter.

These and related objects are accomplished in accordance with the present invention by providing a new and improved system including a novel apparatus and method for forming medium to high density foamed plastic sheet materials from thermoplastic beads, such as expandable polystyrene. The system involves the steps of (1) providing a compression mold having a closed-mold stand-off suited to providing a compression ratio up to about 6:1; (2) completely filling the closed mold in its retracted or stand-off condition with pre-expanded plastic beads having a density substantially less than the desired density of the finished foamed sheet material; (3) heating the filled mold sufficiently to raise the temperature of the pre-expanded beads confined therein to their fusion temperature; (4) compressing the softened plastic while in its heated fusible condition, the compression being controlled to produce the desired density and thickness required in the finished sheet product; (5) subsequently cooling the mold and compressed sheet material to a temperature well below the fusion point of the polymer to assure accurate and controlled thickness of the finished product prior to release from its compressed condition; and (6) opening the mold and ejecting the finished sheet material therefrom. The finished sheet material exhibits a medium to high density, i.e., 5–15 pounds per cubic foot, a fused latticework interior configuration with an elongated, closed-cell, pore structure extending along the plane of the sheet and a continuous, smooth and plane outer surface or skin free of disruption and exhibiting a somewhat higher density than the interior of the sheet material.

A better understanding of the objects, advantages, features, properties and relationships of the invention will be obtained from the following detailed description and accompanying drawings which set forth certain illustrative embodiments and are indicative of the various ways in which the principles of the invention are employed.

DESCRIPTION OF PREFERRED EMBODIMENTS

Figure 1:
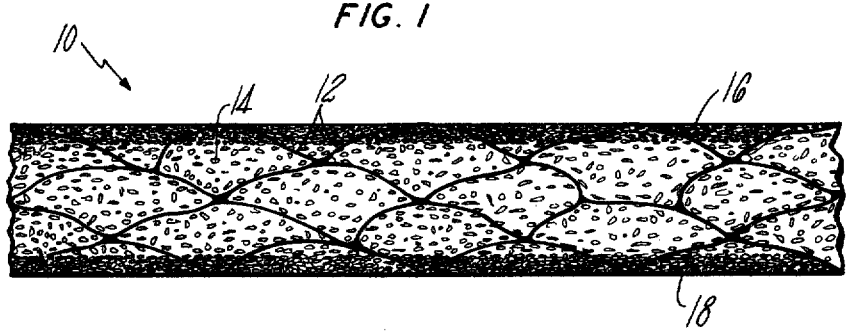
FIG. 1 is an enlarged cross-sectional illustration of the foamed sheet material produced according to the teaching of the present invention, portions of the cross-section being exaggerated for clarity of illustration and ease of understanding.
Figure 2:
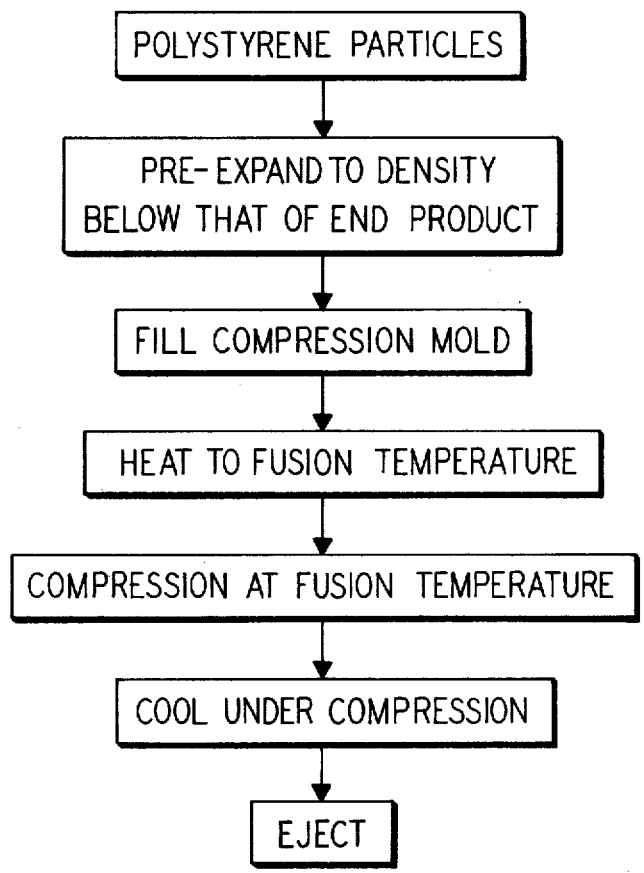
FIG. 2 is a flow diagram of the method steps utilized in accordance with the system of the present invention to provide the sheet material of FIG. 1.

The new and improved foamed plastic sheet material of the present invention is a thin, smooth surfaced board or sheet designated by the numeral 10 in FIG. 1 and comprised entirely of individual expanded plastic beads or particles compression molded into a unified, closed-cell structure of improved flexibility without disruption of the individual cell structures of the component particles. The sheet material is of medium to high density, i.e., it has a density greater than 5 pounds per cubic foot but, due to its foamed nature, less than the bulk density of the solid plastic. The foamed plastic material exhibits excellent strength and reduced brittleness coupled with improved corner strength for applications such as book cover backings. Although the upper density limit is dictated primarily by economic factors, it has been found that the preferred density range of the material is between about 6 and 15 pounds per cubic foot. For example, foamed plastic sheet material used as a replacement for fiber board in book cover backings have shown excellent results at a density level of about 9 pounds per cubic foot.

The foamed sheet material is produced in the form of thin sections having a uniform thickness of no more than about 0.250 inch but preferably greater than 0.05 inch with commercially durable products falling within the thickness range of 0.06 inch to 0.125 inch. For example, a typical thickness for a 9 pound sheet used as a replacement for book cover backings would be about 0.082 to 0.09 inch. Thus, the sheet is a medium density foam structure of thin cross section.

Due to the manner in which the foamed plastic sheet material is formed, the internal structure, as illustrated in FIG. 1, is of compressed honeycomb configuration with a large number of expanded polymeric closed-cell beads of elongated, generally elliptical cross-sectional configuration fused together at their interfaces to form an interlaced meshwork throughout the interior of the sheet. As mentioned, FIG. 1 is an exaggerated illustration of the sheet's cross-sectional configuration but nevertheless appropriately reflects the internal structure of the sheet. The intersecting lines 12 extending through the sheet between opposite surfaces at sharp acute angles to the plane of the sheet material represent areas of the surface fusion of the individual particles during the compression molding operation. These elongated, diagonally extending intersurfaces of particle linkage provide a "hinge effect" at their multitudinous points of intersection and contribute substantially to the greatly improved flexure exhibited by the medium density foamed sheets of the present invention. In fact, the resultant configuration tends to approach the fibrous structure exhibited by fiber board material.

As will be appreciated, the compression molding operation that produces the elongated mesh-like network also tends to elongate the expanded plastic beads in all directions within the general plane of the sheet to produce the elliptical pore configuration shown at 14 in the drawing. It further tends to provide a slightly higher degree of compression within those particles located at the top and bottom exposed surfaces 16 and 18 of the plastic sheet material 10. This higher degree of compression coupled with the smooth, flat or planar surface or skin of the sheet material advantageously provides increased sheet surface strength to a degree that cannot be achieved by hot wire slicing of foam block material or by comparable techniques. Additionally, the fused surfaces 16, 18 are free of disruptions or irregularities frequently evidenced in exposed cell sheet materials. The smooth and plane surface configuration of the sheet material of the present invention has the additional advantage of toughness and improved corner strength, which properties are of substantial importance in the manufacture of backings for book covers, loose leaf binders and the like.

As mentioned hereinbefore, the particular or preferred foamed plastic material utilized in accordance with the present invention is foamed polystyrene. It will, of course, be appreciated that similar thermoplastic material as typified by the vinyl aromatic polymers, of which polystyrene is a specific example, can also be advantageously utilized. A conventional method of producing polystyrene foam is to admix a volatile organic blowing agent with high density polystyrene particles, i.e., polystyrene beads having a bulk density between about 30 and 40 pounds per cubic foot. These and similarly treated synthetic organic thermoplastic materials generally consist of a homogenous mixture of the thermoplastic resin and blowing agent, the latter being an organic compound of low blowing points, such as ether, n-pentane, methylchloride and the like. The mixture generally contains about 6 to 8% of the volatile component and the individual beads have a mesh size of about 20 to 30 mesh or less. Exemplary of the polystyrene beads that can be utilized in accordance with the present invention are the polystyrene materials sold under the tradenames "Styropor" by Badische Anilin & Soda Fabrik A.G. , "Dylite" by Koppers Company, "Pelespan" by Dow Chemical Co. and "Unicrest" by United Cork Co.

The high density, expandable beads are pre-expanded prior to use in accordance with the present invention to achieve the desired bulk density required for the compression molding operation. Thus, the raw material having a bulk density of about 30 to 40 pounds per cubic foot is heated under controlled conditions in an appropriate pre-expanding compartment and under temperature and moisture conditions for the desired time period to cause slight softening of the plastic material and volatilization of the blowing agent. This cause sufficient internal pressure within the heated soft polymer to effect controlled expansion thereof. In accordance with the present invention this pre-expansion operation should be of sufficient time-temperature function to provide expanded particles of closed-cell structure and substantially reduced density relative to the density of the desired end product. Thus, the actual density of the pre-expanded particles is within the range of about 0.75 to 3 pounds per cubic foot, although the material may vary substantially depending on the desired end product. After the pre-expansion of the particles up to about forty time their original volume, the particles remain in an individual unfused and flowable condition. If desired, the raw material can be purchased in a pre-expanded condition thereby eliminating the necessity for the pre-expanding operation.

In accordance with the present invention the pre-expanded polystyrene particles having the requisite low density characteristics are conveyed or blown into a closed mold to completely fill the mold. This operation can be carried out pneumatically, i.e., by an air stream, or by other convenient means. In fact, in the preferred method of the present invention both air and steam are used to fill the mold with the pre-expanded particles up to about 75% of its capacity and air is used as the conveying agent to complete the mold filling operation. The steam advantageously provides interior preheating of the mold cavity and its utilization is particularly important when using the non-vented or limited vented mold preferably employed in the present invention.

As will be appreciated, the particular compression mold utilized must be capable of providing the necessary compression ratio of the molding operation. This ratio is preselected as is the density of the preexpanded polystyrene particles and in this way the system provides multiple control over the density of the finished foamed plastic sheet material. However, as mentioned hereinbefore in order to achieve the new and improved result in a very thin sheet structure of medium to high density, it is necessary that the compression ratio be between at least 2:1 and 6:1 with the preferred operating ratio being about 3:1 to 4:1. Consequently the mold, when filled, is in a closed but non-compressed or stand-off condition. Thus, the mold is provided with an appropriate stand-off of 2X to 6X to keep the mold portions closed but separated by 2 to 6 times the finished thickness of the plastic sheet material.

Prior to the compression operation it is essential that the pre-expanded plastic particles within the mold be heated to their fusion temperature. This is preferably accomplished by further heating the mold with steam or by other means to provide sufficient heat to raise the particles to at least their softening temperature and preferably to their fusion temperature prior to the compression operation. In the case of polystyrene the temperature should exceed 180°F and preferably should reach a temperature of 200°F in order to obtain full advantage of the compression operation.

While continuously heating the material within the mold to a temperature within the range of 200° to 230°F, the particles are compressed to ½ to 1/6 their original thickness to produce the desired elongation and fusion of the particles and the requisite medium to high density, closed-cell structure of about 6 to 15 pounds per cubic foot. It is particularly important in connection with the compression operation that the compression be substantially uniform through the entire extent of the mold in order to achieve optimum conditions for imparting the desired uniform characteristics to the resultant sheet material. At the same time, the temperature in the mold must be carefully controlled to prevent an excessive temperature rise within the mold since such high temperature can cause cell collapse and initiate thermal and chemical degradation of the material.

After the sheet material has remained in its heated and compressed condition for a sufficient length of time, which in the case of the preferred polystyrene of the present invention is a matter of seconds, the mold is cooled while under compression with water, air or other suitable coolant, to a temperature below 150°F. Maintaining the mold in its compressed condition assures controlled accuracy in the thickness of the finished product and more uniform quality throughout the sheet. Thereafter the mold is opened and the finished sheet is ejected to complete the molding sequence.

Figure 3:
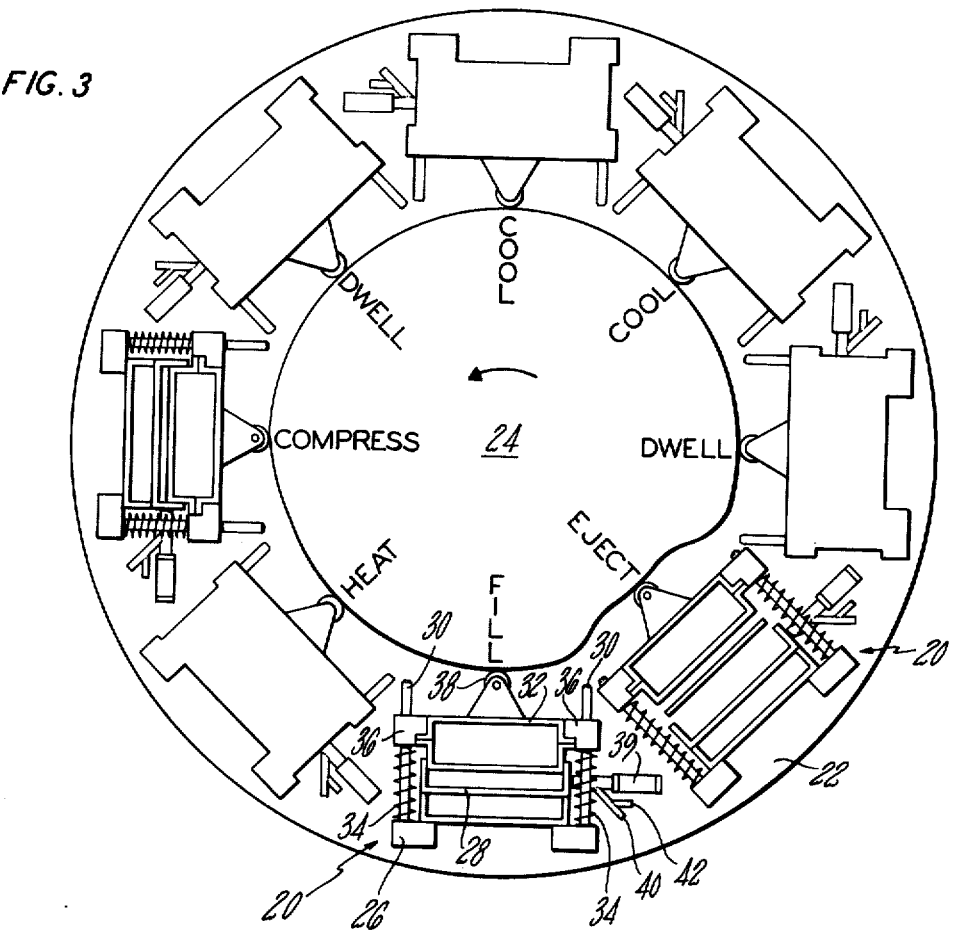
FIG. 3 is a schematic illustration of a machine used in carrying out the process of FIG. 2.

Although compression molding has been used for some time for converting plastic raw materials into finished products, its most common usage has been for molding thermosetting materials and only infrequently has it been used for thermoplastics. The apparatus employed in accordance with the present invention is preferably of the high-speed automatic type but is illustrated in FIG. 3 in simplified and schematic fashion to facilitate the description of its operation. In the particular embodiment illustrated the apparatus is shown as having a plurality of individual mold presses, generally designated 20, fixedly mounted on a stationary platform 22 for controlled operation by a control cam 24 of predetermined configuration. Although a dual cam arrangement is employed in the preferred embodiment, the first cam setting the fully open condition of the molds and the second cam controlling the compression ratio and operating sequence of the molding cycle, these features are shown as combined in the single cam member 24.

Each mold press 20 is substantially identical and consists of a supporting base 26 fixedly mounting a stationary mold cavity 28 and a plurality of upstanding guidbars 30 for slideably mounting a movable plunger 32 toward and away from the cavity between open, closed and compressed positions. The plunger is biased toward its fully open position by the compression springs 34 mounted on the guide rods 30, the springs 34 acting against the stationary supporting base 26 and side extensions 36 of the plunger 32. The press is further provided with a cam following roller 38 secured to the plunger 32 for contacting the control cam 24 and moving the plunger toward and away from the mold cavity in response to rotation of the control cam in a counter-clockwise direction as viewed in FIG. 3.

Each mold press 20 is further provided with suitable means for introducing the expanded plastic particles into the closed mold, such as by a conduit 39 shown as being combined with suitable inlets 40, 42 for introducing either air or steam or both. The air and steam is used, not only for loading the pre-expanded particles into the mold, but also for heating the filled mold cavity, cooling the mold upon completion of the compression molding operation and ejecting the finished product.

The replaceable cam 24 conveniently controls not only the compression ratio imparted to the mold but also the various functions of the mold during the entire molding operation and these functions are designated in FIG. 3 at the different operating stations of the cam. For example, after selection of the appropriate compression ratio, the mold is moved from its open position where the finished sheet is ejected to its closed, yet non-compressed or stand off condition to permit the mold cavity to be completely filled with the pre-expanded polymer particles of low density. Desirably the charge of particles is metered to assure control over the finished product. However, metering is not necessary where the density of the pre-expanded material and the compression ratio are otherwise closely controlled.

The closed mold is then subjected to an initial heating operation by bringing the temperature of the particles to the desired temperature level of about 200°–230°F to effect softening and initial fusion thereof. As mentioned, this is preferably accomplished by the introduction of steam through the appropriate inlet conduit 42. The steam will quickly raise the temperature of both the mold and the particles within the cavity, assuring more uniform performance during the compression step and greater accuracy in the final product. The heated, softened particles will, of course, tend to further expand upon heating and assume full tangental contact even prior to the compression operation.

As the control cam 24 rotates toward the compression station, it smoothly drives the plunger 32 into the cavity portion 28 of the mold causing controlled and uniform compression of the plastic particles in their heated and softened state. This forces the softened surfaces of the individual particles into intimate contact causing the material to flow and fuse into the mesh-like configuration described heretofore. At the same time, entrapped air is expelled from the mold to provide a release of pressure and simultaneously assist in the control over the temperature of the material in the mold during the compression operation. The mold preferably is maintained in this compressed condition throughout the remainder of the molding operation until it is fully opened at the ejection station for removal of the molded sheet. The compression preferably takes place with heating and, as indicated in FIG. 3, this portion of the cycle can be appropriately controlled by introducing a "dwell" station into the operating cycle prior to the cooling operation.

Subsequently the mold is cooled while maintaining plunger 32 in its compressed position until the temperature of the mold and the sheet material therein has been reduced to a temperature well below the softening point of the plastic, e.g. to a temperature of about 150°F or less for polystyrene. This cooling operation can be achieved by passing air, cold water, or other coolants through the mold parts along many of the same conduits previously utilized for passage of steam during the heating operation.

After the mold has cooled sufficiently, the control cam 24 releases the plunger 32 so that it will move away from the cavity portion 28 toward its fully open condition under the influence of the compression springs 34. The thin molded foamed sheet material may then be ejected from the mold in a conventional fashion, such as by air jets or the like.

As can be appreciated from the foregoing description, the present invention advantageously provides a new and improved thin foamed polymer sheet or board material of controlled density and thickness. This new material exhibits improved resiliency and flexibility, permitting its use as a replacement for fibrous board materials in the manufacture of not only book cover backings but also for related applications such as greeting cards, photograph mailers, portfolio stiffeners and the like. A unique, closed-cell, internal structure is provided having an elongated fused latticework configuration for imparting reduced brittleness and improved flexibility to this medium density, yet very thin sheet material. These improved results are achieved through the utilization of a compression molding system employing a compression ratio of at least 2:1 and a particular sequence of heating, compression and cooling operations capable of imparting to the sheet the new and beneficial properties described herein.

As will be apparent to persons skilled in the art, various modifications, adaptations and variations of the foregoing specific disclosure can be made without departing from the teachings of the present invention.

I claim:

1. A foamed plastic sheet material of improved flexibility and reduced brittleness suited for use in place of fiber board material for book cover backings and the like consisting essentially of compressed polyvinyl aromatic plastic particles of closed-cell structure having a density of 5–15 pounds per cubic foot, said sheeting having planar exposed surfaces, a thickness of about 0.50–0.25 inch and a cross-section of uniform thickness containing a latticework comprised of a multiplicity of continuous, diagonally extending and intermeshed areas of cell-separating fused particle interface winding through the interior of the thin sheet wherein the areas of fused particle interface extend between the exposed surfaces of the sheet at sharp acute angles thereto and intersect to provide a hinge effect at their points of intersection, the closed and separated cells being elongated along the plane of the sheet and of a generally elliptical configuration, each exposed surface exhibiting a smooth, continuous uninterruped surface skin of said thermoplastic material, said sheet exhibiting a density gradiant across its thickness with the higher density being at both of said planar surfaces.

2. The thin foamed plastic sheet material of claim 1 wherein the thermoplastic material is polystyrene.

3. A foamed plastic sheet material of claim 1 wherein the sheet has a thickness of about 0.06–0.125.

4. The foamed plastic sheet material of claim 1 wherein the thermoplastic material is polystyrene having a density of about 10 pounds per cubic foot and the sheet material exhibits a thickness of 0.1 inch.

* * * * *